(12) United States Patent
Stocker

(10) Patent No.: US 9,630,294 B2
(45) Date of Patent: Apr. 25, 2017

(54) MACHINE TOOLS AND METHODS OF OPERATION THEREOF

(75) Inventor: Mark Andrew Stocker, Holcot (GB)

(73) Assignee: Fives Landis Limited, Keighley (GB)

(*) Notice: Subject to any disclaimer, the term of this patent is extended or adjusted under 35 U.S.C. 154(b) by 627 days.

(21) Appl. No.: 12/863,786

(22) PCT Filed: Jan. 21, 2009

(86) PCT No.: PCT/GB2009/050041
§ 371 (c)(1),
(2), (4) Date: Sep. 14, 2010

(87) PCT Pub. No.: WO2009/093064
PCT Pub. Date: Jul. 30, 2009

(65) Prior Publication Data
US 2010/0330880 A1 Dec. 30, 2010

(30) Foreign Application Priority Data

Jan. 25, 2008 (GB) .................................. 0801366.6
Jun. 27, 2008 (GB) .................................. 0811759.0

(51) Int. Cl.
*B24B 49/00* (2012.01)
*B24B 47/22* (2006.01)
(Continued)

(52) U.S. Cl.
CPC ................ *B24B 47/22* (2013.01); *B23Q 1/25* (2013.01); *B23Q 1/4804* (2013.01);
(Continued)

(58) Field of Classification Search
CPC ....... B24B 41/005; B24B 41/02; B24B 41/06; B24B 47/10; B24B 47/20; B24B 47/22;
(Continued)

(56) References Cited

U.S. PATENT DOCUMENTS 3,712,752 A * 1/1973 Varga .............................. 408/42
3,879,898 A 4/1975 Loxham et al.
(Continued)

FOREIGN PATENT DOCUMENTS

DE 199 02 137 C1 6/2000
EP 0305735 A2 3/1989
(Continued)

OTHER PUBLICATIONS

International Search Report and Written Opinion for corresponding International Application No. PCT/GB2009/050041, dated Apr. 17, 2009.
(Continued)

*Primary Examiner* — Eileen Morgan
(74) *Attorney, Agent, or Firm* — Wood Herron & Evans LLP

(57) ABSTRACT

A machine tool is provided which comprises a machine base (10), a first support (20,100) mounted on a first rotational machine axis on the base, and a second support (22,102) mounted on a second rotational machine axis on the base. The second rotational axis is parallel to and spaced laterally from the first rotational axis and carries a mount (38,112) moveable relative to the second support along a first linear machine axis orthogonal to the second rotational axis. A control arrangement is operable to control the orientation of the first support on the first rotational axis, and the orientation of the mount relative to the second rotational axis and its location along the linear axis, so as to govern the position and orientation of the first support and the mount relative to each other. Existing machine tools often use long linear guide rails and stacked orthogonal axes which introduce alignment and offset errors. The present invention avoids the need for and/or reduces the number of these structures in machine tools.

21 Claims, 16 Drawing Sheets

(51) Int. Cl.
  *B23Q 1/25* (2006.01)
  *B24B 41/00* (2006.01)
  *B24B 47/20* (2006.01)
  *B23Q 1/54* (2006.01)
  *B23Q 1/48* (2006.01)

(52) U.S. Cl.
  CPC .......... *B23Q 1/5425* (2013.01); *B24B 41/005* (2013.01); *B24B 47/20* (2013.01); *B24B 49/00* (2013.01)

(58) Field of Classification Search
  CPC ...... B24B 49/00; B23Q 1/265; B23Q 1/4804; B23Q 1/5425
  USPC .................. 451/8, 9, 10, 11, 14, 19, 179
  See application file for complete search history.

(56) References Cited

U.S. PATENT DOCUMENTS

| | | | | |
|---|---|---|---|---|
| 4,068,413 | A | * | 1/1978 | Suddarth .................. 451/159 |
| 4,115,956 | A | * | 9/1978 | Huffman ..................... 451/4 |
| 4,186,529 | A | * | 2/1980 | Huffman ..................... 451/4 |
| 4,461,121 | A | * | 7/1984 | Motzer et al. ................ 451/5 |
| 4,608,643 | A | * | 8/1986 | Breitenstein et al. ........ 700/164 |
| 4,679,471 | A | * | 7/1987 | Wauchope et al. ............. 82/12 |
| 4,760,672 | A | * | 8/1988 | Darcangelo et al. .......... 451/42 |
| 4,833,764 | A | * | 5/1989 | Muller .......................... 29/40 |
| 5,231,587 | A | * | 7/1993 | Frost ........................ 700/164 |
| 5,839,862 | A | | 11/1998 | Hayashi et al. |
| 6,553,875 | B1 | | 4/2003 | Miyano |
| 7,874,895 | B1 | * | 1/2011 | Toycen ....................... 451/11 |
| 8,151,437 | B2 | * | 4/2012 | Muller et al. ................. 29/563 |
| 2004/0035266 | A1 | | 2/2004 | Montesanti et al. |
| 2007/0096763 | A1 | * | 5/2007 | Ehrmann et al. ............. 324/765 |

FOREIGN PATENT DOCUMENTS

| | | |
|---|---|---|
| EP | 0 816 012 A1 | 1/1998 |
| EP | 1 048 395 A2 | 11/2000 |
| GB | 2408224 A | 5/2005 |
| GB | 2441312 A | 3/2008 |
| GB | 2 456 843 A | 7/2009 |
| WO | 01/56739 A1 | 8/2001 |
| WO | WO-2008/024962 A2 | 2/2008 |
| WO | 2009/093064 A1 | 7/2009 |

OTHER PUBLICATIONS

ESPACENET, English Machine Translation of EP0305735A2, published Mar. 8, 1989, retrieved from http://worldwide.espacenet.com on Apr. 10, 2012 (13 pages).

ESPACENET, English Machine Translation of EP0816012A1, published Jan. 7, 1998, retrieved from http://worldwide.espacenet.com on Apr. 10, 2012 (10 pages).

ESPACENET, English Machine Translation of DE19902137C1, published Jun. 29, 2000, retrieved from http://worldwide.espacenet.com on Apr. 10, 2012 (8 pages).

United Kingdom Intellectual Property Office, Patents Act 1977 Combined Search and Examination Report under Sections 17 & 18(3), Application No. GB0922392.6, dated Jun. 17, 2010 (3 pages).

United Kingdom Intellectual Property Office, Patents Act 1977 Examination Report under Section 18(3), Application No. GB0922392.6, dated Aug. 30, 2011 (3 pages).

European Patent Office, International Search Report and Written Opinion of the International Searching Authority, International Application No. PCT/GB2010/052155, dated Nov. 30, 2011 (12 pages).

United Kingdom Intellectual Property Office, Patents Act 1977 Examination Report under Section 18(3), Application No. GB0922392.6, dated Mar. 30, 2012 (2 pages).

United States Patent and Trademark Office, Non-Final Office Action, U.S. Appl. No. 13/511,161, dated May 8, 2013 (12 pages).

United States Patent and Trademark Office, Final Office Action, U.S. Appl. No. 13/511,161, dated Sep. 27, 2013 (7 pages).

United States Patent and Trademark Office, Office Action, U.S. Appl. No. 13/511,161, mailed on Apr. 4, 2014 (10 pages).

European Patent Office, Extended European Search Report, Application No. 13184618.0, mailed on Jul. 21, 2014 (5 pages).

United States Patent and Trademark Office, Office Action, U.S. Appl. No. 13/511,161, mailed on Mar. 16, 2015 (11 pages).

* cited by examiner

MACHINE TOOLS AND METHODS OF OPERATION THEREOF

CROSS REFERENCE TO RELATED APPLICATION

This application is related to co-pending U.S. patent application Ser. No. 13/511,161, filed May 22, 2012, entitled "Machine Tools And Methods Of Operation Thereof."

FIELD OF THE INVENTION

The present invention relates to machine tools and in particular, reduction of alignment errors in such tools.

BACKGROUND TO THE INVENTION

There are many applications for machine tools that require the motion of two points in space to be controlled relative to each other, in both position and angle over a swept area or volume. It is desirable to minimise the number of machine axes involved to optimise this control. It is also desirable to maintain a very tight stiffness loop between the two points and ideally a constant value of stiffness in the loop as the position and angle of the points are adjusted. This improves the level of accuracy and repeatability of the motion.

Existing machine tools often use long linear guide rails to enable contact between a cutting tool (such as a grinding wheel) and a workpiece at any position along the workpiece's length. Shorter linear guide rails may be carried by the long rails in order to facilitate motion of a cutting tool towards or away from the workpiece, in a direction orthogonal to the long rails. These stacked rails (or axes) introduce unwanted compliance, reducing the tool-to-component stiffness. This in turn leads to reduced component quality, in terms of its dimensional precision and finish. Also, the long linear guide rails typically need to be least as long as the workpiece to be machined. This often results in an axis with a poor bearing ratio where the axis is most compliant in the direction of the cutting force. This problem is compounded when an orthogonal infeed axis is stacked upon the long axis.

The use of stacked axes is also problematic if on-axis position encoders are employed. The taller the stack of axes, the greater the distance between the points of interest and the encoders. This results in "Abbe offset" errors which reduce the intrinsic precision of the machine tools.

Furthermore, the use of orthogonal stacked linear axes requires time consuming and expensive alignment to maintain orthogonality between the axes and to minimise the pitch, yaw and roll errors for each axis.

These long linear axes also require long telescopic covers that are expensive, to introduce friction, prone to failure and furthermore may influence the precision of linear motion (for example its straightness, positioning precision and repeatability).

The present invention seeks to overcome the problems above associated with use of long guide rails, and reduce the need for stacked, orthogonal axes.

SUMMARY OF THE INVENTION

The present invention provides a machine tool comprising:
   a machine base;
   a first support mounted on a first rotational machine axis on the base;
   a second support mounted on a second rotational machine axis on the base, wherein the second rotational axis is parallel to and spaced laterally from the first rotational axis and carries a mount moveable relative to the second support along a first linear machine axis orthogonal to the second rotational axis; and
   a control arrangement operable to control the orientation of the first support on the first rotational axis, and the orientation of the mount relative to the second rotational axis and its location along the linear axis, so as to govern the position and orientation of the first support and the mount relative to each other.

This configuration allows control of the relative position and orientation of respective points carried by the supports and reference axes passing through those points. It avoids the need for long linear axes and a stacked linear axis, thereby countering the problems associated with the known configurations discussed above.

An array of stacked axes often results in compliant stiffness loops between the two points of interest. Additionally, it is usually the case that linear axes are far less stiff in a direction that is orthogonal to the direction of motion. Rotary axes may be configured such that the stiffness is uniform in all radial directions radially outwards from the axes of rotation. This results in more predictable stiffness loop and often a higher stiffness, which in turn result in a higher level of precision and repeatability. In accordance with embodiments of the invention, rotary axes provide the primary position and angle control between the two points of interest to afford axisymmetric stiffness properties in the primary motion control axes.

In contrast to existing machine tools, the rotary axes may be mounted in a relatively inexpensive flat bed or table, formed of granite, cast iron or polymer concrete for example.

Furthermore, the use of rotatable supports means that workpieces, cutting tools, dressing wheels and the like can be moved to an accessible position, for example at the front of the machine tool, for loading and/or replacement operations.

In existing machine tools, the use of long linear axes requires heavy power and services cables which can influence machine operation and lead to additional axis error motions, reversal errors, variable friction forces and axis misalignment. In contrast, in a machine tool according to the present invention, the rotatable supports may be coupled to cable coils suspended from above, avoiding linear cable drag.

Furthermore, instead of the long telescopic covers used with long linear axes, the use of rotational primary axes in embodiments of the invention means that solid, rotating covers or labyrinths may be used. These may have no friction joints and avoid any influence of the motion of the precision machine axes.

Also, known machine tools often require an additional linear axis to be provided under the footstock in order to counter "taper" errors, caused by misalignment of machine centres relative to the machine's linear axes. The use of rotary axes according to the present invention avoids this issue.

The term "machine axis" denotes a physical machine axis, as opposed to a reference axis. Each machine axis has two portions which move relative to each other, about or along a reference axis.

Reference to a machine axis "mounted on the base" herein indicates that one of said portions of a machine axis mounted on the base is fixed in position relative to the base.

In a preferred embodiment, one of the supports provides movement relative to the machine base along a second linear machine axis parallel to its rotational axis. This extra dimension of movement facilitates control of the relative position and orientation of respective points carried by the supports over a volume of space.

The movement of the mount may be in a radial direction with respect to the rotational axis of the second support. The linear axis along which the mount is moveable may enable movement of a tool mounted thereon towards or away from a workpiece during machining and therefore only needs be relatively short, minimising any misalignment errors. With a grinding wheel mounted on the mount, this embodiment facilitates plunge, taper, angle and interpolation grinds over the full length of a workpiece. It is particularly suitable for grinding slender, multi-featured components such as cam and crankshafts.

The longitudinal axis of a workpiece mounted on the other support may be spaced from the second respective axis, for example with the workpiece near the periphery of the support so that its full length is readily presentable to a tool on the one support. More particularly, the longitudinal axis of the workpiece may be located in an orientation orthogonal to a radial line extending from the respective rotational axis.

The supports may be independently rotatable about their respective rotational axes. Alternatively, they may be arranged for rotation such that rotational movement of one support in one direction is matched by equivalent rotation of the other support, but in the opposite direction.

The rotational position of the supports may be selectively lockable relative to the machine base. For example, during a plunge grinding operation, only one axis, namely the linear axis of the mount is "live", making the dynamic stiffness of the machine tool during grinding significantly greater than that of a conventional machine tool employing linear guide rails only. Each rotary axis may be lockable for example by servo holding, using a brake, or by turning off associated air or hydrostatic bearings so as effectively to ground the respective axes.

In preferred embodiments, the supports are supported on the machine base by journal and thrust bearings. Large thrust bearings may be mounted directly upon the machine base to provide highly stiff, damped axes with a very good bearing ratio in all directions resulting in axisymmetric stiffness characteristics. A flat, planar machine base can readily be constructed upon which to mount the two rotary axis thrust planes.

Rotation of the supports relative to the machine base may be effected by respective direct drive motors.

Preferably, each support includes a rotation sensor for providing a signal related to the rotational position of the respective support relative to the machine base. The control arrangement may receive the signals from the rotation sensors and control the rotational positions of the supports. In particular, such a control arrangement may be configurable to compensate for inaccuracy in the motion of these supports during a machining operation. This error correction may be employed for example to maintain the trueness of relative motion between a cutting tool and a workpiece, rather than merely rely on the straightness of a machine's linear axes.

In a preferred implementation, one of the supports carries a tool mount, which may be in the form of a grinding wheelhead adapted to rotate a grinding wheel mount thereon for example. It may be orientated such that the rotational axis of the grinding wheel is orthogonal to, and may be spaced from, the first rotational axis.

Alternatively, or in addition, a support may carry a tool such as a turning tool, one or more gauges, or sensors, such as a polishing tool inspection sensor for example. Combinations of tools, gauges, dress tools and the like may be provided on each support and selected as appropriate by rotation of the respective support.

Two tool mounts may be carried by one of the tool supports, each moveable relative to one tool support independently of the other along mutually parallel linear axes orthogonal to the first rotational axis. In this way, two features may be machined on a workpiece simultaneously. At least one of the tool mounts may also be moveable relative to the one support along a further linear axis to alter the spacing of the tool mounts.

The other support may be arranged to support an elongate workpiece with its longitudinal axis in a plane orthogonal to the rotational machine axes.

The present invention further provides a method of machining a workpiece using a machine tool as defined above, comprising the steps of:
  mounting a workpiece on one of the supports;
  rotating the supports to present a selected portion of the workpiece to a cutting tool carried by the other support; and
  machining the selected portion of the workpiece with the cutting tool.

In this way, the rotary axes may be used to bring a cutting tool to the required position along a workpiece. The rotary axes may then be locked and the first linear machine axis employed to feed a cutting tool into the workpiece.

The method may also include the further steps of:
  rotating the supports in opposite directions and moving the workpiece and/or the cutting tool relative to the respective support to engage a second portion of the workpiece with the cutting tool; and
  machining the second portion of the workpiece with the cutting tool.

With synchronisation of the rotation of the supports and the movement of the workpiece and/or the cutting tool relative to the respective support, a cutting tool may be traversed along an elongate workpiece, enabling the generation of complex component profiles.

The present invention also provides a method of machining a workpiece using a machine tool as defined above, comprising the steps of:
  mounting a workpiece having a longitudinal axis on one of the supports;
  rotating the other support such that the rotational axis of a grinding wheel carried by the other support is non-parallel with respect to the longitudinal axis of the workpiece; and
  grinding the workpiece with the grinding wheel with the rotational axis of the grinding wheel at an angle to the longitudinal axis of the workpiece.

A further method is provided in accordance with the invention which comprises the steps of:
  (a) mounting a workpiece on one of the supports;
  (b) mounting a tool having a reference axis on the other support; and
  (c) moving the first support relative to the first rotational axis and the mount relative to the second rotational axis and the first linear axis such that a predetermined curved surface is defined on the workpiece whilst maintaining the reference axis of the tool perpendicular to said surface.

A method of calibrating a machine tool as defined above is also provided, comprising the steps of:
(a) mounting a laser light source on one of the supports;
(b) emitting a laser beam from the light source which is incident on an optical device supported by the other support;
(c) monitoring the laser beam path with respect to the positions of the supports as measured by respective rotation sensors;
(d) calculating positioning errors; and
(e) calibrating the control arrangement so as to reduce the errors.

The optical device may be a detector, or a reflector for reflecting incident laser light back towards a detector mounted on the other support, for example. In a preferred implementation, dual laser beams are employed and interferometry used to measure the distance between the laser light source and the optical device.

The use of two primary rotational axes enables the use of software error correction to maintain position, straightness, and angular motion control between the two points of interest, rather than having to rely upon the straightness of the machine's linear axes. During machine build, it is possible to measure the position of the interpolated linear motion between the two points and make software compensations.

The present invention has a wide range of potential applications in which the position and angle of two points relative to each other need to be controlled over a swept area or volume. In particular, it may be especially beneficial in the machining, inspection or positioning of complex components that require control of position or angle over a swept area or volume. One specific example is diamond turning where it is often necessary to maintain a cutting tool in a normal orientation relative to a surface being machined.

BRIEF DESCRIPTION OF THE DRAWINGS

A known machine tool and embodiments of the invention will now be described by way of example with reference to the accompanying schematic drawings wherein.

It should be noted that the Figures are schematic only. The same reference signs are generally used to refer to corresponding or similar features in modified and different embodiments.

DETAILED DESCRIPTION OF THE DRAWINGS

Figure 1:
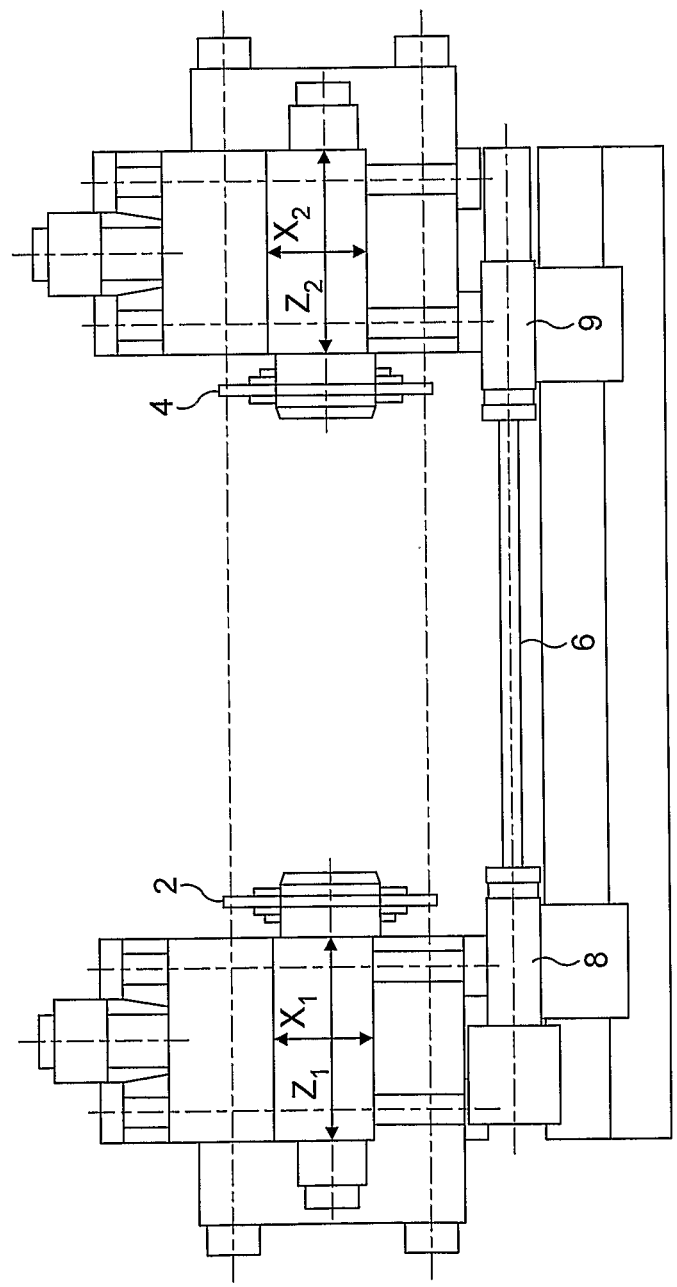
FIG. 1 is a plan view of a known linear axis machine tool.

FIG. 1 shows the layout of a known type of linear axis machine tool. It includes two grinding wheels 2, 4 for grinding a workpiece 6 mounted between a headstock 8 and tailstock 9. Each grinding wheel is moveable along a linear axis Z1, Z2 to access any axial position along the workpiece 6. Additional linear axes X1 and X2 are stacked upon axes Z1 and Z2 to move each grinding wheel towards or away from the workpiece and thereby control the diameter of features machined on the workpiece.

Figure 2:
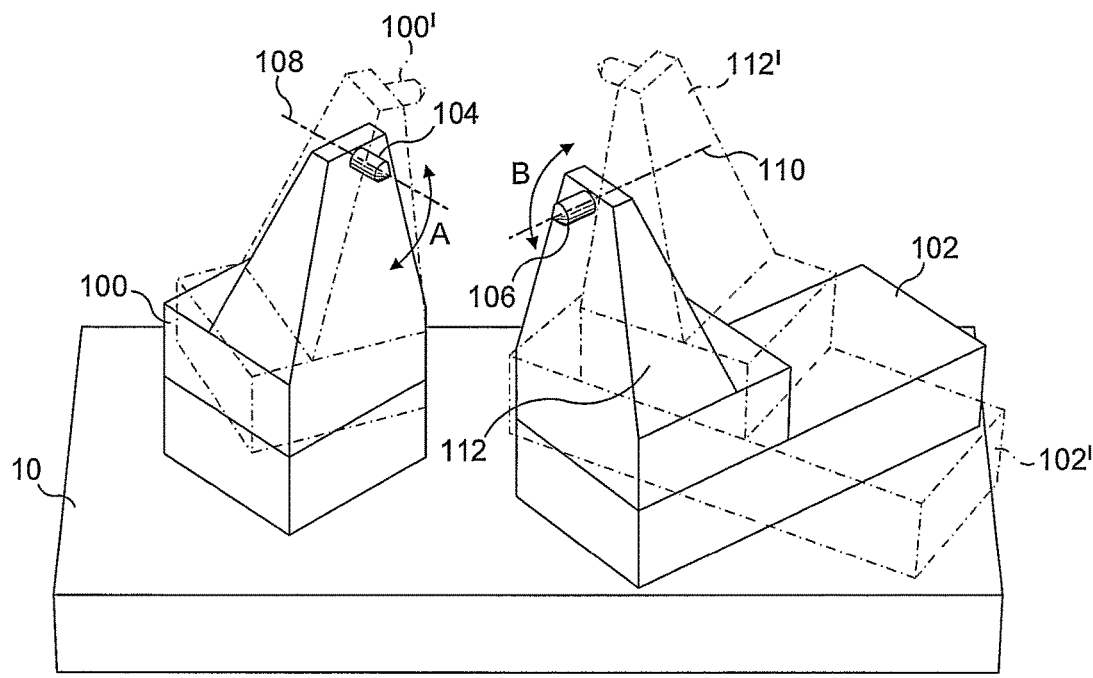
FIGS. 2 to 8 are perspective views of a machine tool embodying the invention to illustrate the operation thereof.

FIG. 2 is a perspective schematic representation of a machine tool embodying the invention. It includes a machine base 10. First and second supports 100, 102 are mounted directly on the base for rotation about respective rotational machine axes which are perpendicular to the plane of the machine base. Their rotational motion is indicated by arrows A and B respectively. Points 104 and 106 denote reference points associated with each support. Each point has a reference axis 108, 110 passing through it.

A mount 112 is carried by the second support 102 and is movable along a linear machine axis. Reference point 104 is on the first support, and reference point 106 is on mount 112, carried by the second support 102. Control of the position and orientation of the first support and the mount is considered herein with reference to points 104 and 106 and their associated reference axes 108 and 110.

Ghost representations 100', 102' and 112' of the first support, second support and mount are included in FIG. 2 to show different orientations thereof following rotation about their respective rotational machine axes. This illustrates movement to alter the angle between the reference axes 108 and 110.

Figure 3:
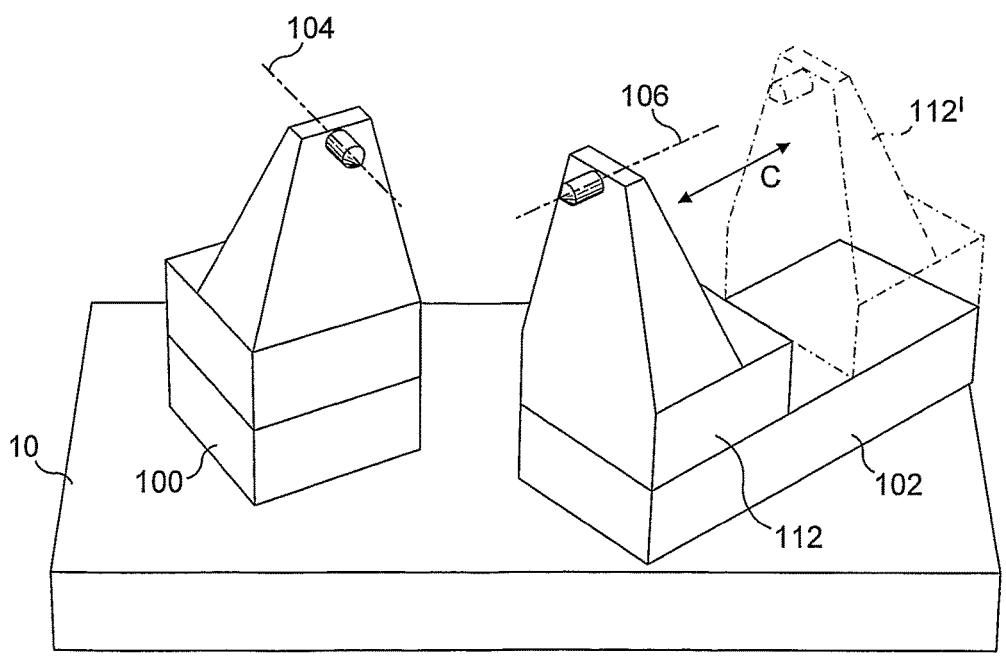

FIG. 3 illustrates movement of mount 112 along its linear axis to a second position 112' shown in ghost outline. Arrow C denotes the direction of motion. This capability facilitates control of the distance between the two fixed points 104 and 106. Combination of the two rotary axes and one linear axis enables controlled motion of the points in both position and angle over a swept area, as will be illustrated further below with reference to FIGS. 4 to 6.

Square S denotes an area by way of example that can be swept by the two fixed points 104 and 106.

Figure 4A:
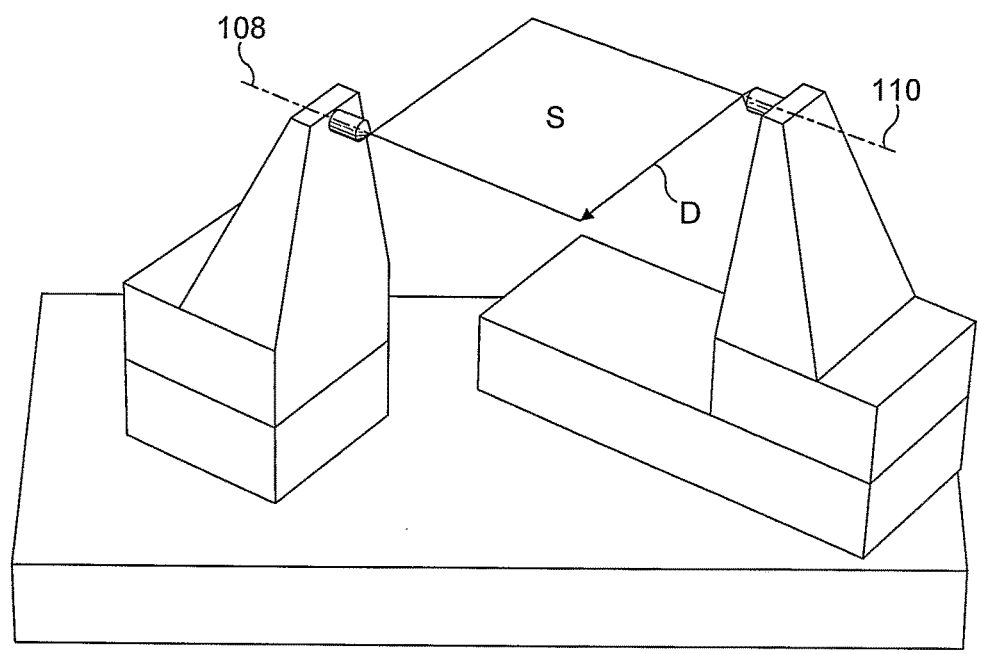
Figure 4B:
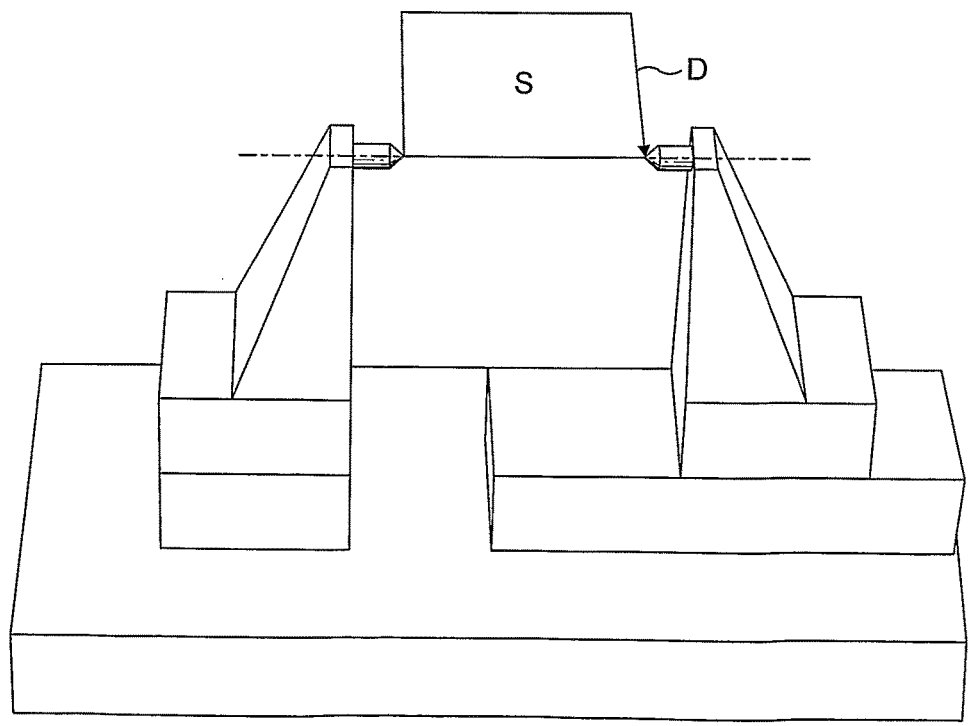

FIGS. 4a and 4b illustrate control of the orientation of the two points in angle and position by movement with respect to the three axes. A parallel relationship between the reference axes 108 and 110 is maintained as point 106 travels in direction D along one side of the square.

Figure 5A:
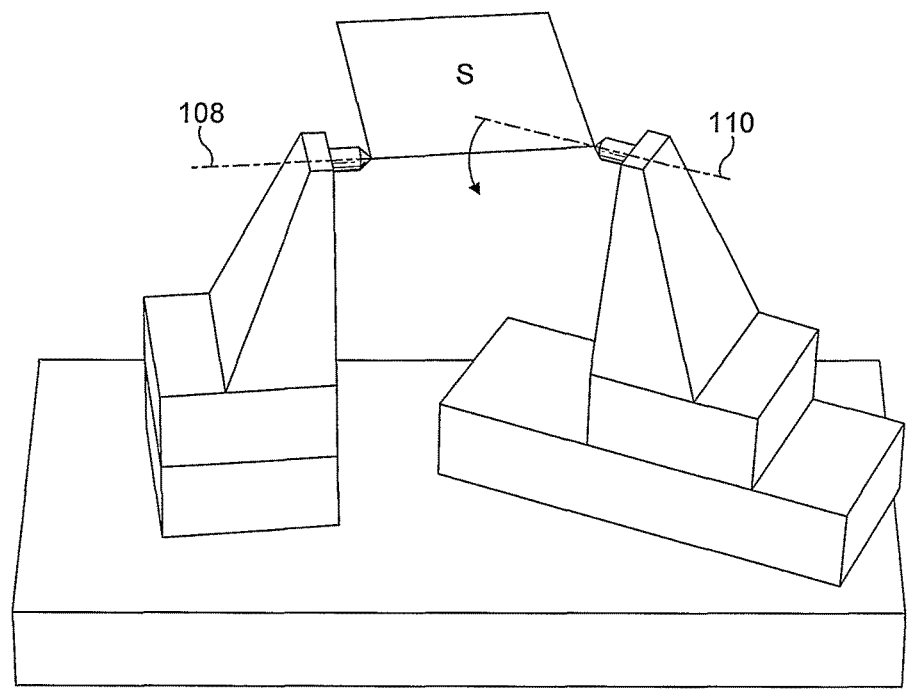
Figure 5B:
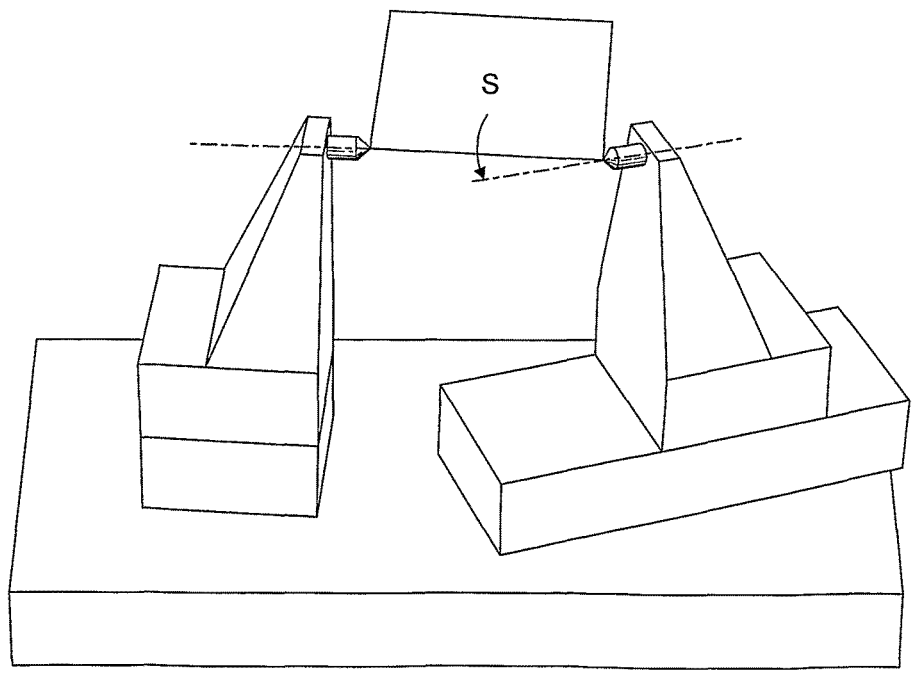

FIGS. 5a and 5b illustrate a change in the angle between the reference axes 108 and 110 whilst maintaining a constant distance between the reference points 104 and 106. This motion is achieved by synchronised control of the two rotary axes and the linear axis.

Figure 6A:
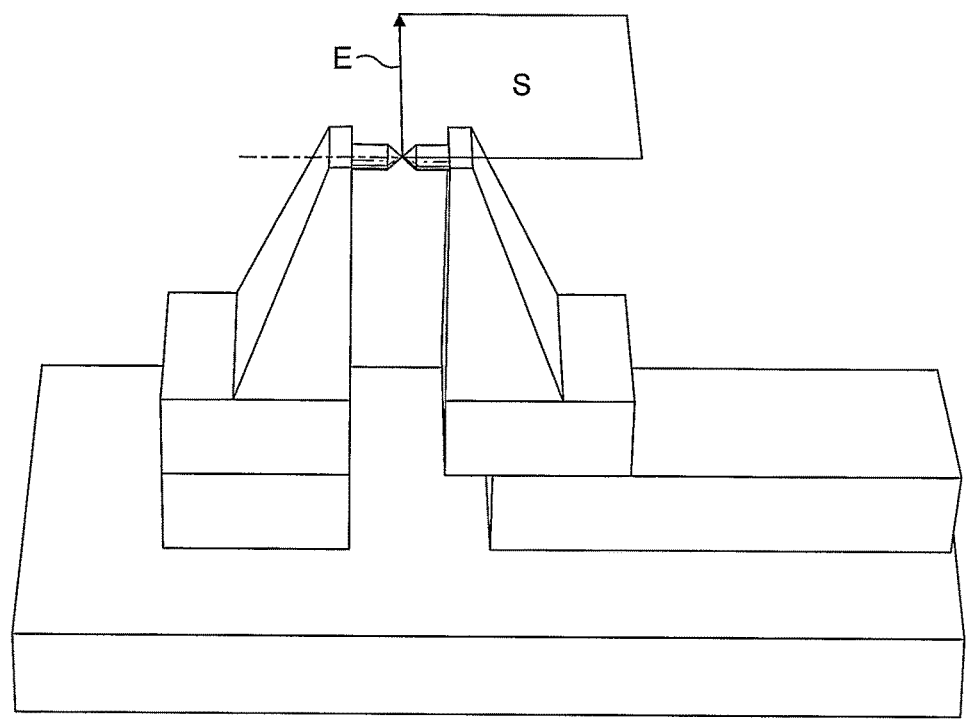
Figure 6B:
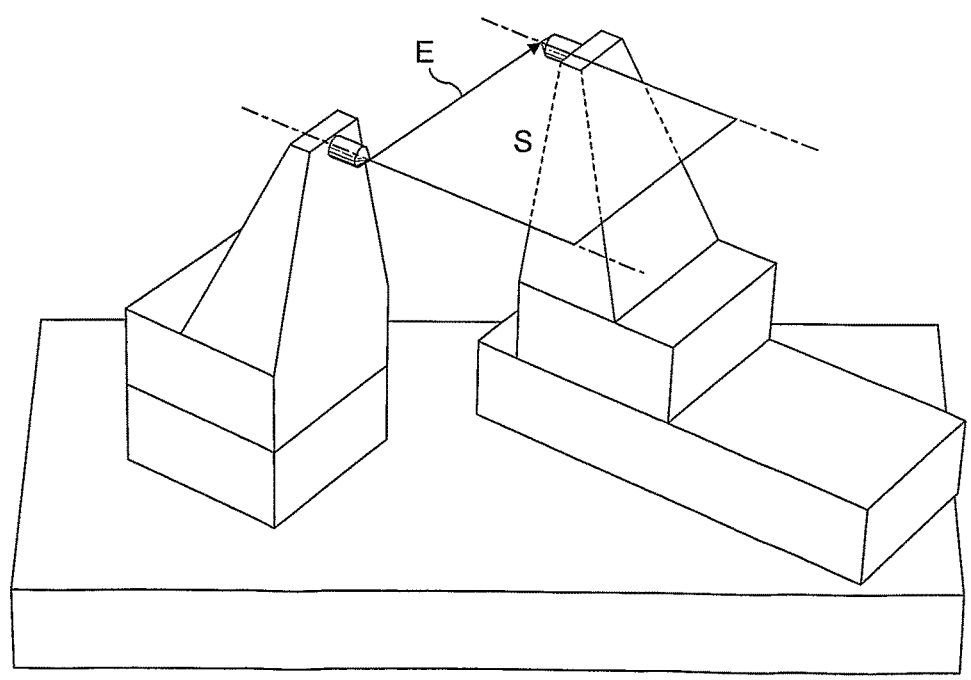

FIGS. 6a and 6b illustrate maintenance of a parallel relationship between the axes 108 and 110 whilst increasing the separation between those axes. In this way, reference point 104 stays at one corner of square S, whilst reference point 106 moves away therefrom along one side of the square, this path being labelled E in the Figures.

Figure 7:
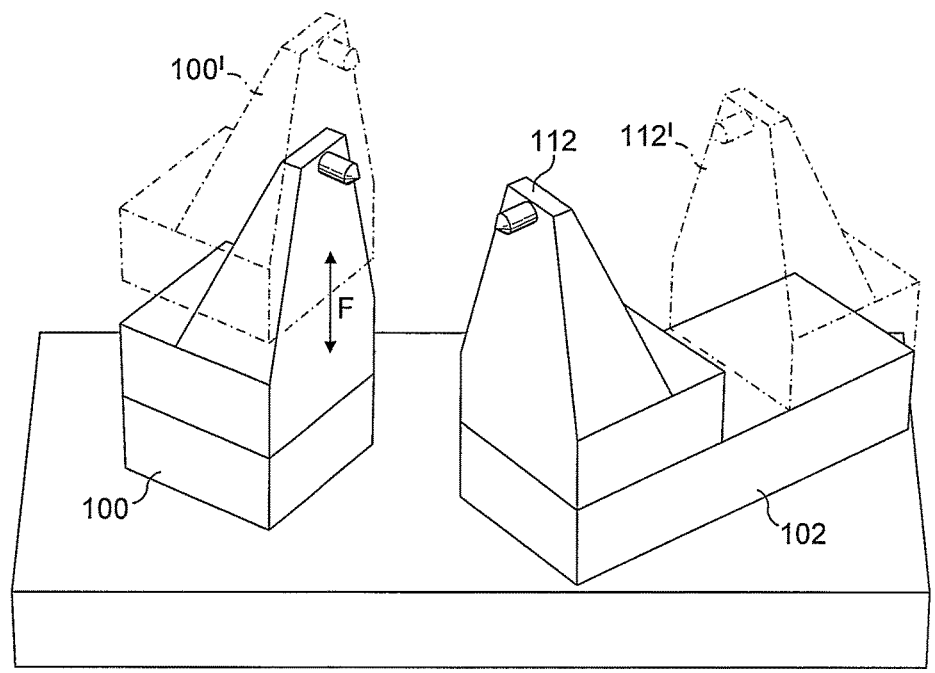

FIG. 7 shows a machine tool configuration in which the first support 100 is also moveable along a linear machine axis F, which is parallel to its rotational axis. The position of the support following movement along this axis is shown by ghost outline 100'. This further dimension of movement facilitates control of the position and orientation of the first support and the mount relative to each other over a swept volume.

Figure 8A:
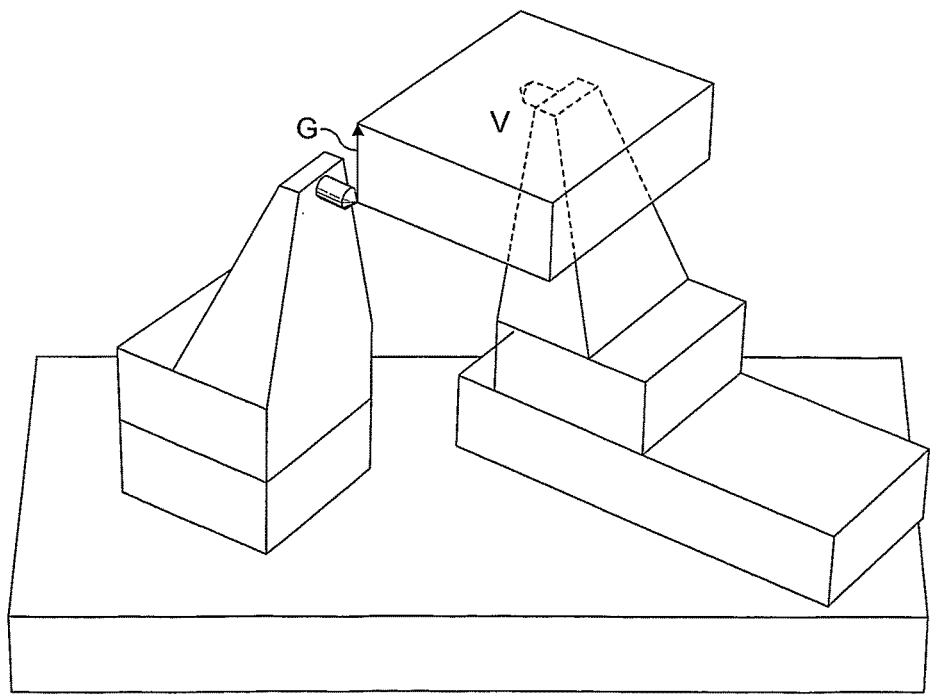
Figure 8B:
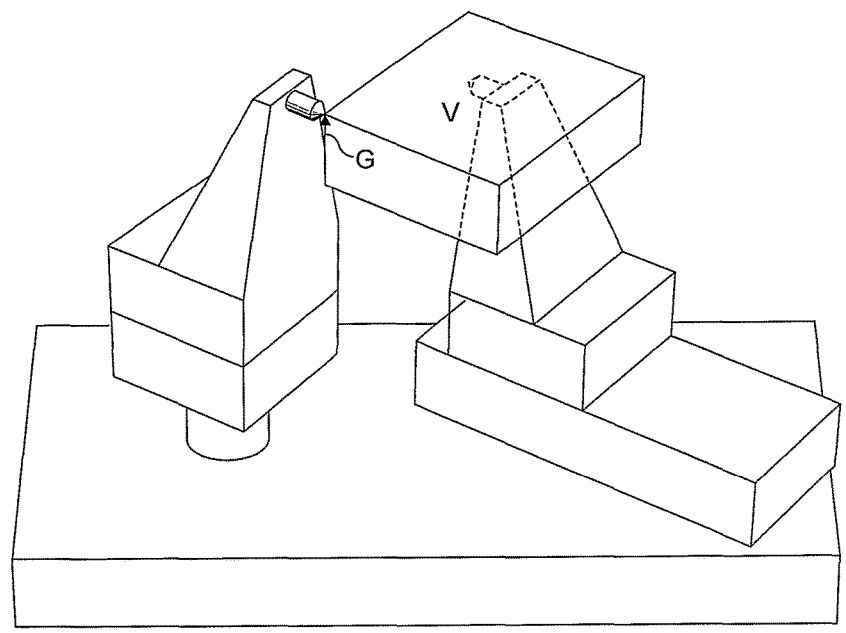

By way of illustration, FIG. 8a and FIG. 8b include an outline of a volume V over which the position and angle of the two fixed points 104, 106 may be controlled. Movement of support 100 along its vertical linear axis is shown in these figures, which moves reference point 104 in the direction of arrow G up a vertical edge of the volume V.

The inventor has determined that it is advantageous to mount the horizontal linear machine axis on the associated rotational machine axis instead of the opposite way round. One reason for this will now be described with reference to FIGS. 9 and 10.

Figure 9:
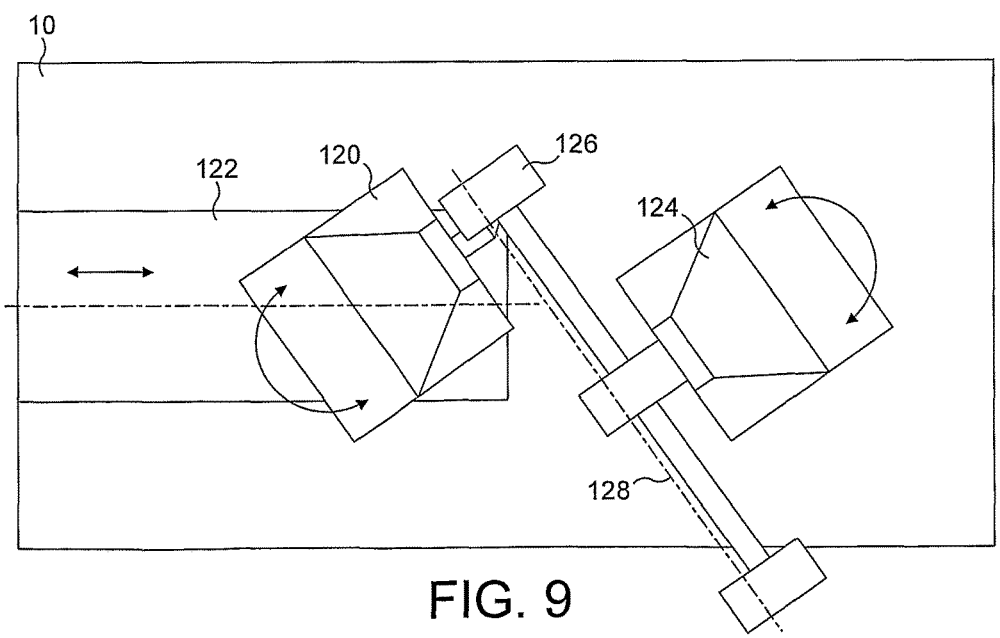
FIG. 9 is a plan view of a machine tool including a rotary axis mounted on a linear axis.
Figure 10:
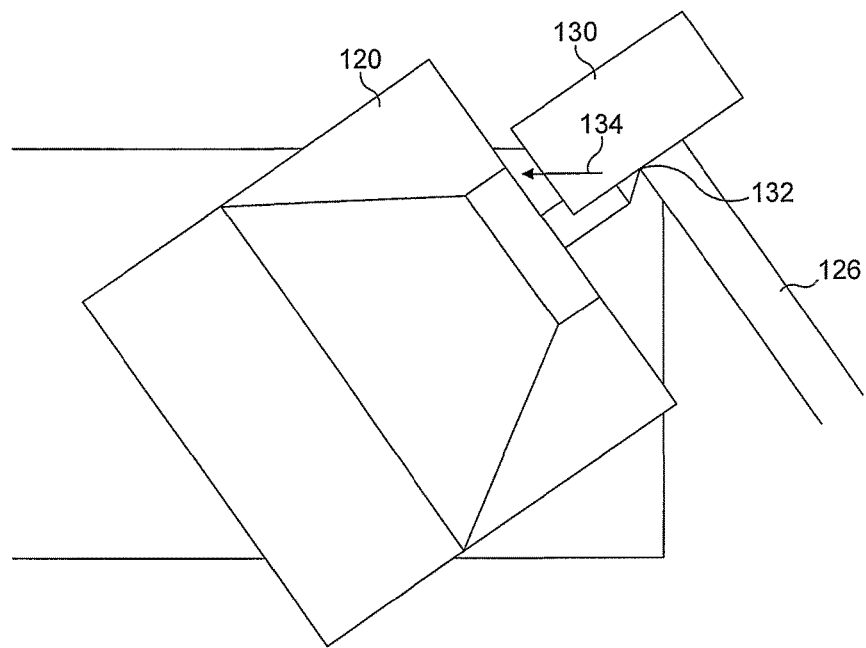
FIG. 10 is an enlarged view of part of FIG. 9.

In the configuration shown in FIG. 9, mount 120 is rotatably mounted on support 122. Support 122 is in turn carried by a linear machine axis on the machine base 10. Support 124 is mounted on a rotational machine axis on the base. An elongate workpiece 126 with shoulder features perpendicular to its longitudinal axis 128 is mounted on the support 124.

In order to define a perpendicular shoulder feature 130 on the workpiece 126, it is necessary to move reference point 132 in a direction perpendicular to the longitudinal axis 128 of the workpiece. To optimise control of this motion, it would be preferable to only exercise one machine axis to traverse reference point 132 along the component shoulder. However, it can be seen that if the linear axis were withdrawn in this configuration, point 132 would follow path 134 instead (see FIG. 10). In order to follow the component's perpendicular shoulder, all three machine axes (two rotary and one linear) would need to be synchronised.

Figure 11:
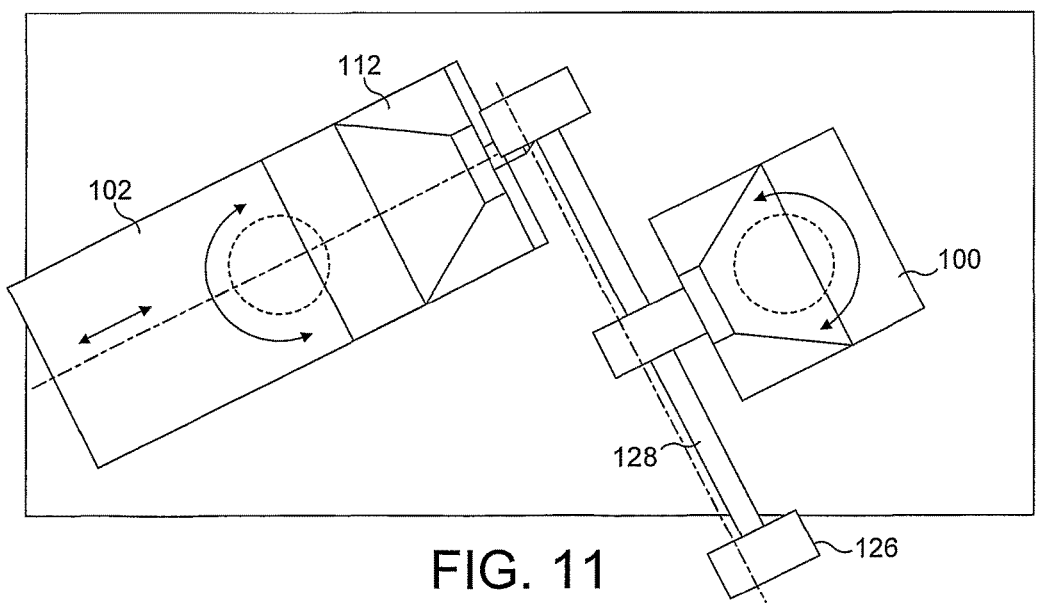
FIG. 11 is a plan view of a machine tool embodying the invention (including a linear axis mounted on a rotary axis) to illustrate machining of an elongate workpiece.
Figure 12:
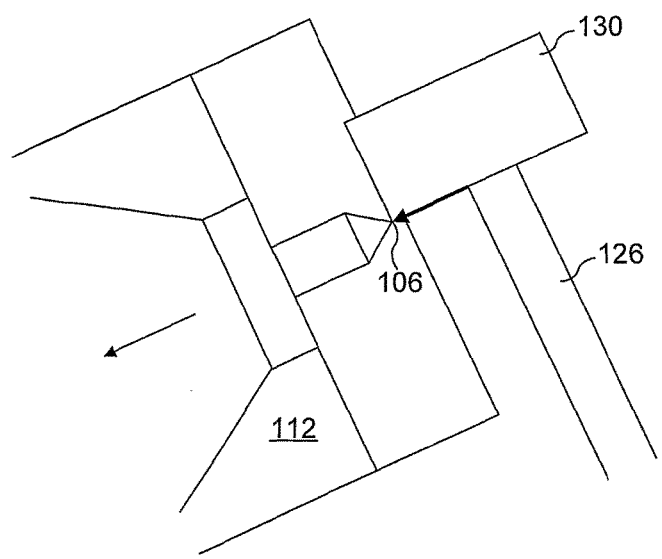
FIG. 12 is an enlarged view of part of FIG. 11 following linear movement of the mount.

In contrast, using a machine tool embodying the invention as depicted in FIG. 11, the linear machine axis is mounted upon a rotary axis. This enables the supports 100, 102 and mount 112 to be orientated such that the reference axes 108, 110 are parallel prior to movement of reference point 106 along the workpiece shoulder. This movement is then achieved by movement of mount 112 along its linear machine axis alone, as shown in FIG. 12.

Motion with respect to the three machine axes may be interpolated in order to enable access by reference point 106 to the length of the elongate workpiece 126.

Figure 13:
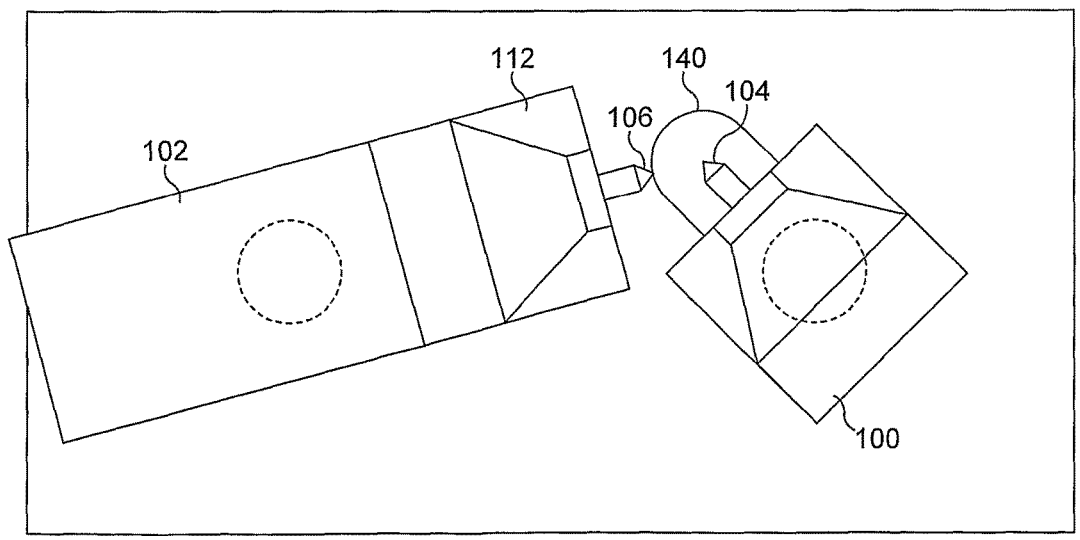
FIGS. 13 to 15 are plan views of a machine tool embodying the invention to illustrate maintenance of "tool normal" relative to a machined surface.
Figure 14:
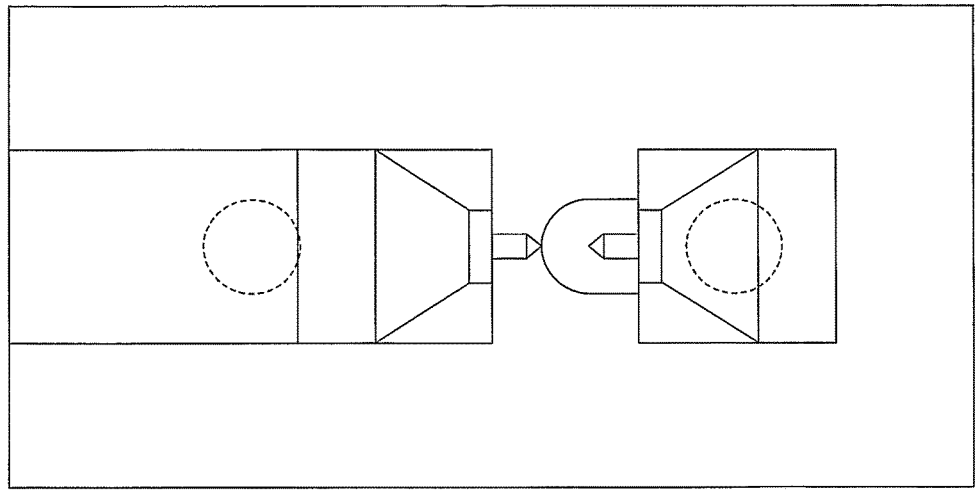
Figure 15:
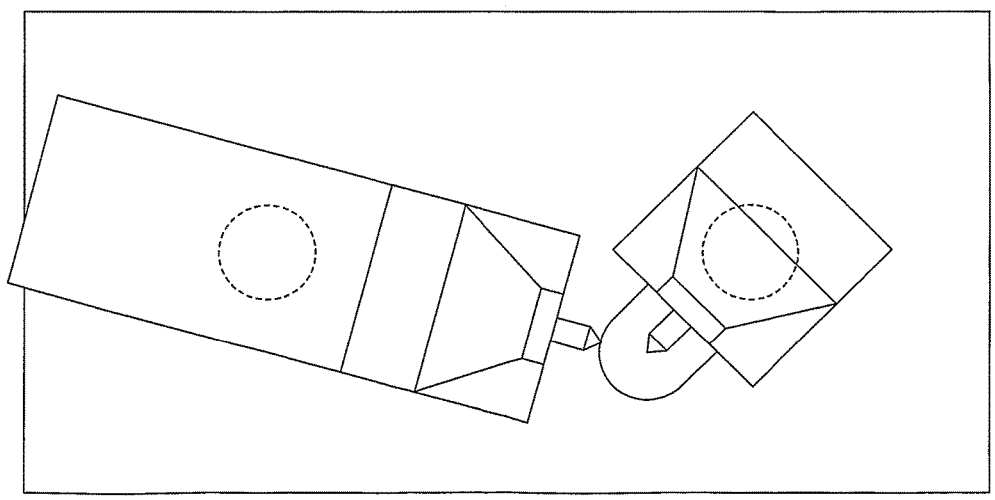

FIGS. 13 to 15 show successive orientations of the two supports 102, 104 and mount 112. Reference point 106 defines a spherical surface 140 equidistant from reference point 104 whilst maintaining its reference axis 110 in a perpendicular "tool normal" orientation with respect to that surface.

The maintenance of "tool normal" is a common requirement for successful diamond turning of high precision components. It is often essential (in order to maintain component geometry and constant cutting conditions) that the same point on the tool remains in contact with the component being machined at all times.

If the form being machined is anything other than flat, the position of the tool axis must be adjusted relative to the component if "tool normal" is to be maintained.

Often machines mount the cutting tool upon an additional rotary axis in order to enable "tool normal" machining. The present machine design enables tool normal without requiring an additional axis.

Figure 16:
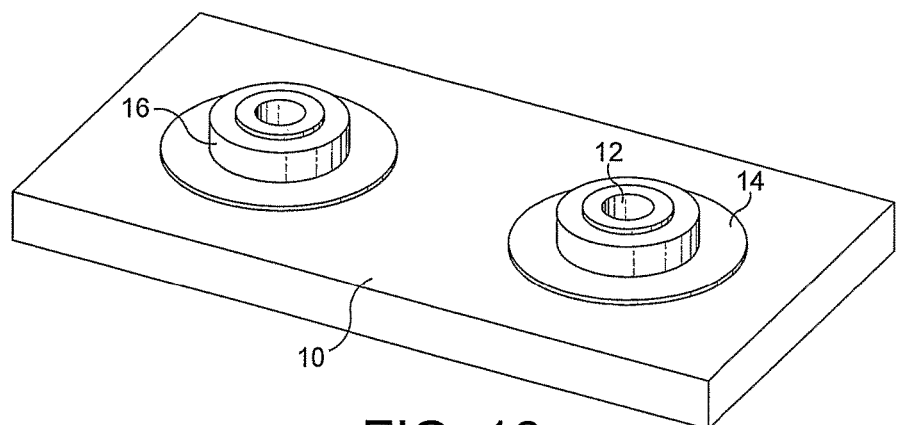
FIG. 16 is a perspective view of a machine base for use in the machine tool embodying the present invention.

FIG. 16 shows a machine platform for use in a machine tool embodying the invention. Two rotary axes are fitted to the machine base 10. Each axis includes a rotary, journal bearing 12, a large rotary, thrust bearing 14 and a direct drive motor 16. Each thrust bearing may have a relatively large diameter (for example of 0.75 to 1 m or more) or more making it extremely stiff. The rotary journal and thrust bearing may be aerostatic, hydrostatic or similar. The axis mounts' features can be machined into the machine base. In view of the relative simplicity of the configuration, they can be very precisely aligned to each other. An on-axis rotary encoder may also be provided in association with each axis. A workpiece support is associated with one axis and a tool support with the other.

Figure 17A:
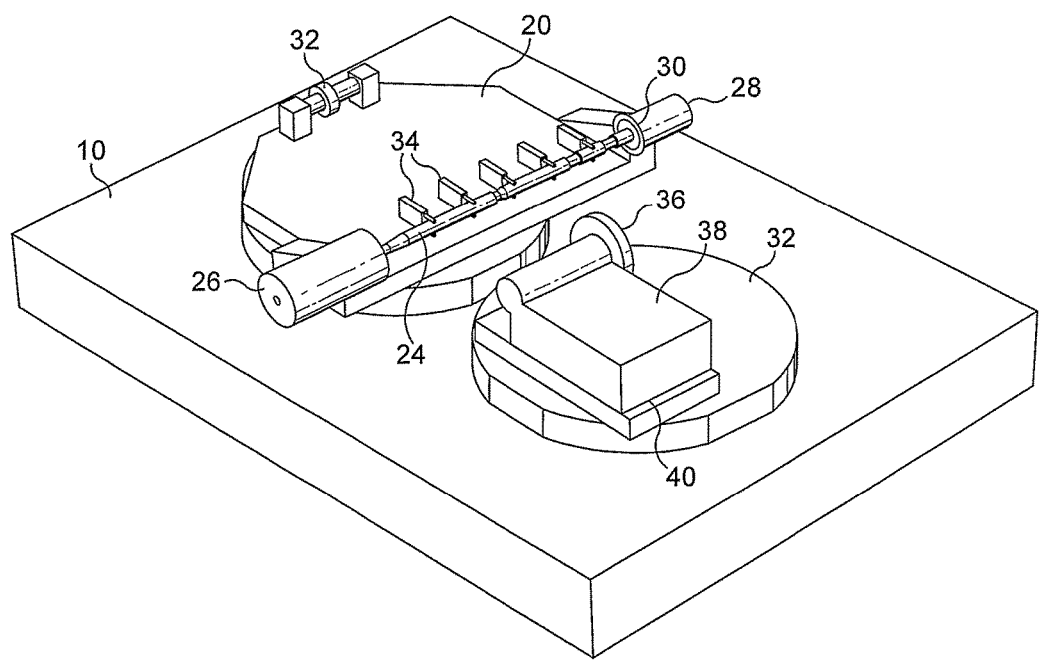
FIGS. 17a and 17b are perspective views of a machine tool embodying the invention, with additional detail included in the view of FIG. 18b.
Figure 17B:
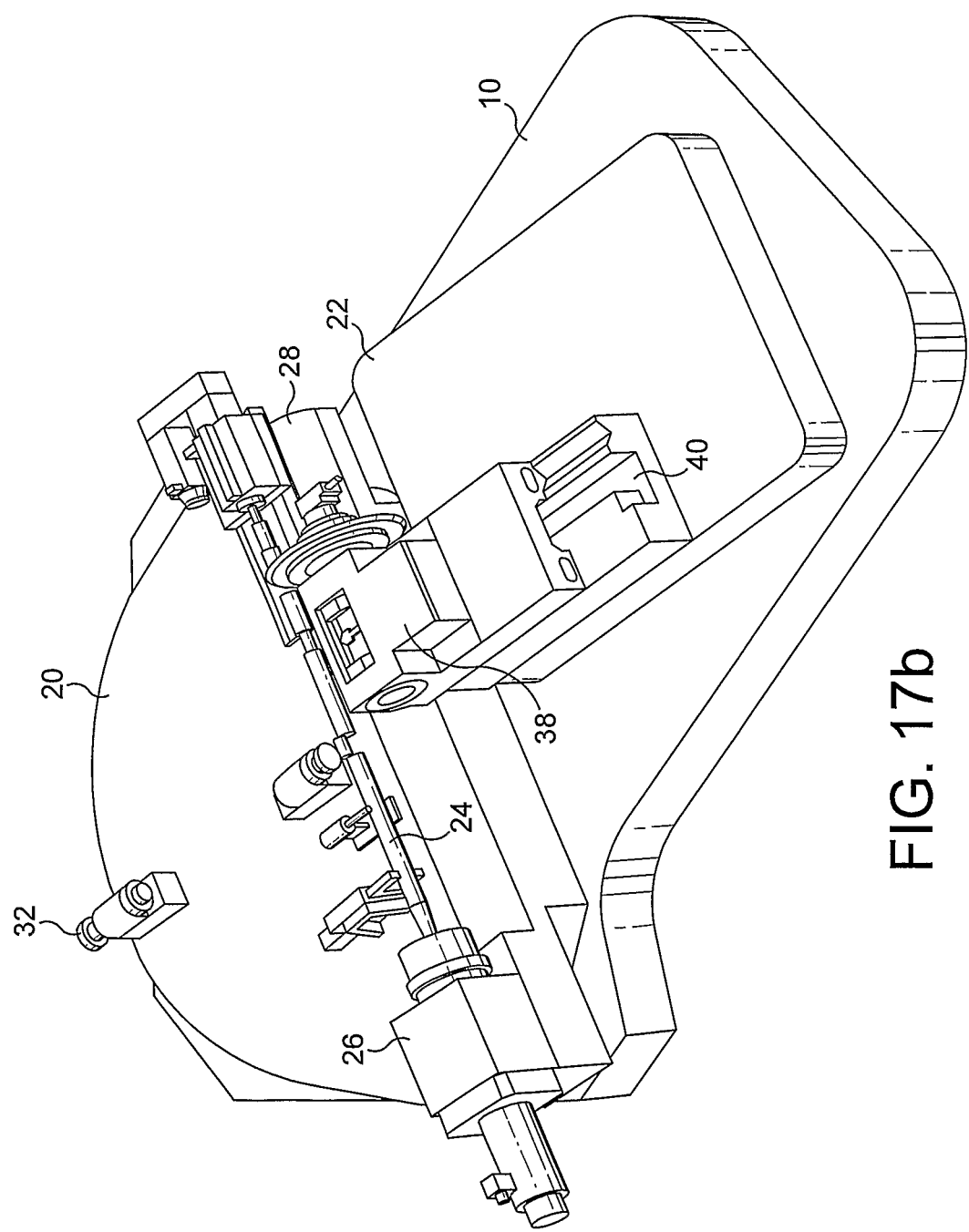

Schematic diagrams illustrating embodiments of the invention are shown in FIGS. 17a and 17b. A workpiece support 20 is provided on one axis and a tool support 22 on the other. A workpiece 24 is mounted between headstock 26 and tailstock 28 on the workpiece support 20. A traversing dress tool 30 and a full form dress roll 32 are also provided on the workpiece support 20. A series of component steadies 34 is also shown. It will be appreciated that a variety of gauges, grinding, dressing, and/or forming wheels and other cutting tools such as turning tools may be provided on the workpiece support as appropriate.

A grinding wheelhead 38 is provided on the tool support 22. A linear axis 40 is provided to facilitate movement of a grinding wheel 36 towards or away from the workpiece. Multiple grinding wheels or other tools may be provided on the tool support. For example, an indexing head could be included to facilitate selection of one of several tools mounted on the machine at the same time.

In FIG. 17b, an embodiment including two rotary axes and one linear axis is shown in more detail.

Figure 18A:
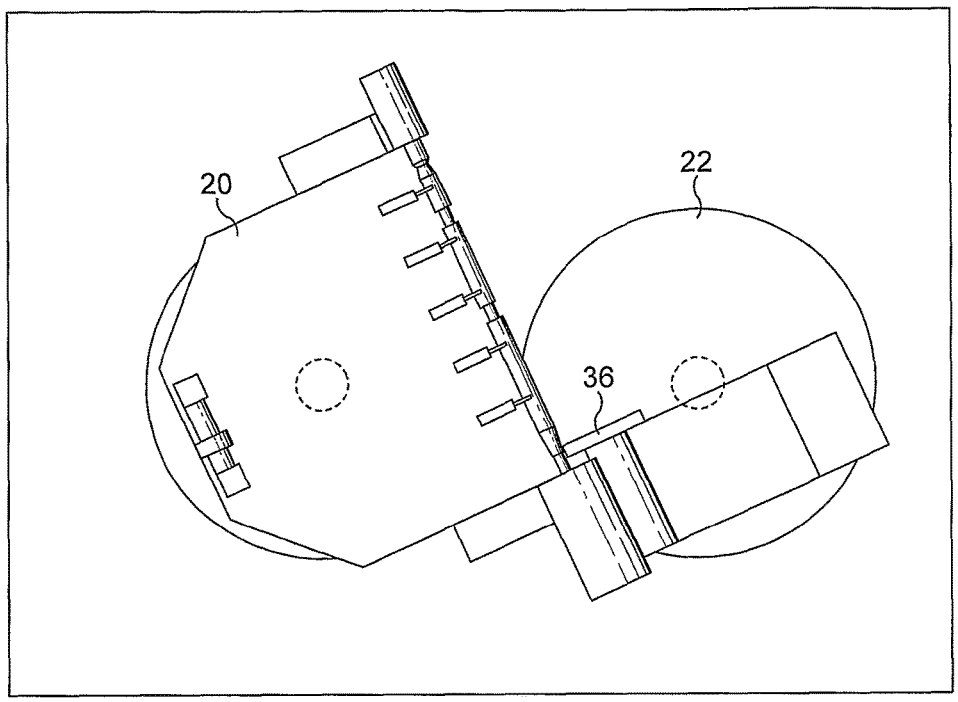
FIGS. 18a to 18c are plan views of a machine tool embodying the invention showing successive stages of the machining of an elongate workpiece.
Figure 18B:
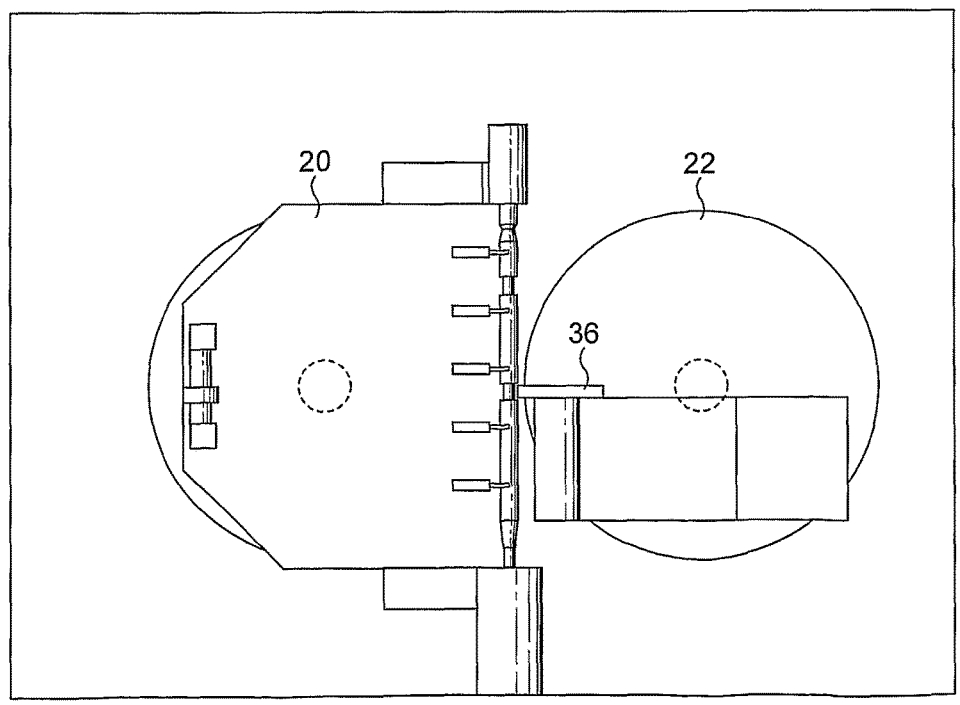
Figure 18C:
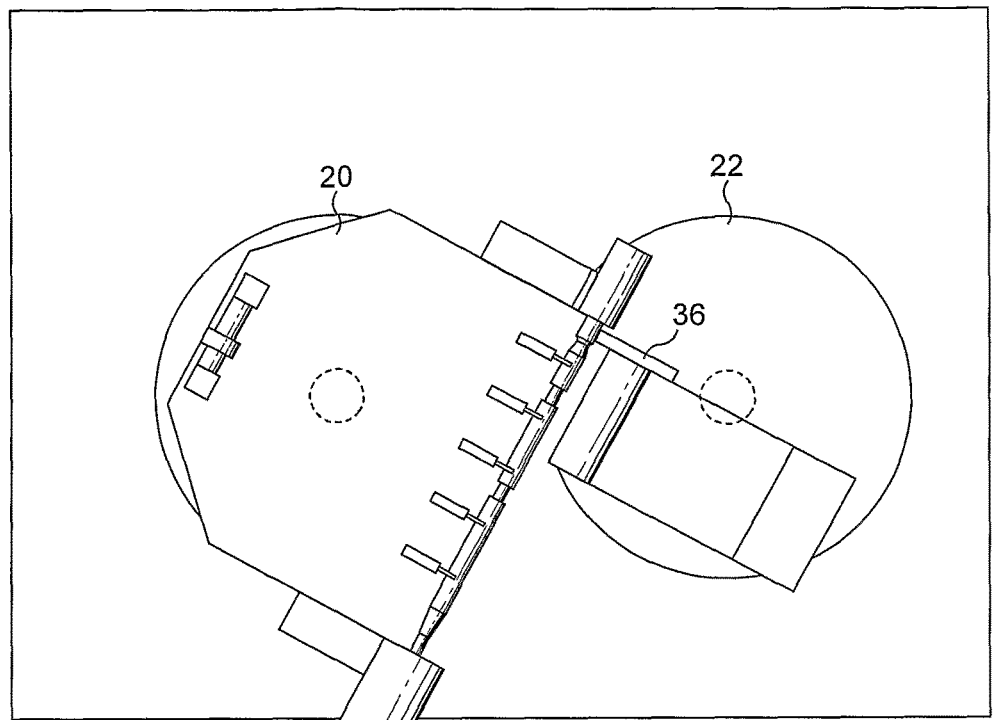

The sequence of views shown in FIGS. 18a to 18c illustrate how an embodiment including three axes of motion (two rotary, one linear) allows a grinding wheel to gain access to the full length of an elongate workpiece. It can be seen that there is adjustment of the linear axis position as the two rotary axes move relative to the machine base in order to move the grinding wheel axially along the surface of the component.

Figure 19:
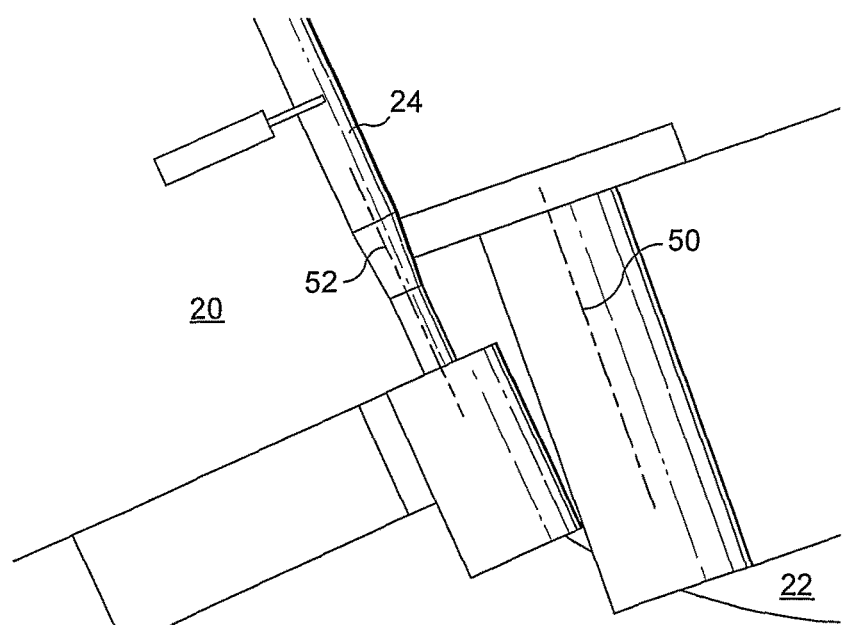
FIG. 19 is an enlarged partial plan view illustrating the machining of a taper on a workpiece.

FIG. 19 illustrates how adjustment of the relative rotational orientations of the tool support 22 and workpiece support 20 can be used to create an angle between the rotational axis 50 of a grinding wheel 36 and the longitudinal axis 52 of a workpiece 24, to facilitate formation of a tapered profile on the workpiece.

Figure 20:
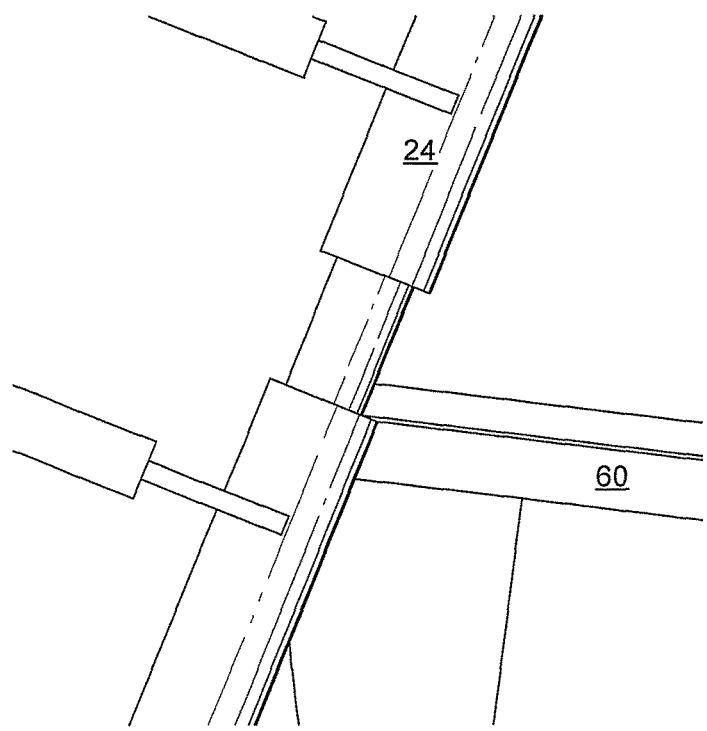
FIG. 20 is a partial enlarged plan view showing machining using a pre-formed grinding wheel.

FIG. 20 illustrates how a pre-formed grinding wheel 60 may be employed using a machine tool embodying the invention to form predetermined profiles on a workpiece 24.

Figure 21:
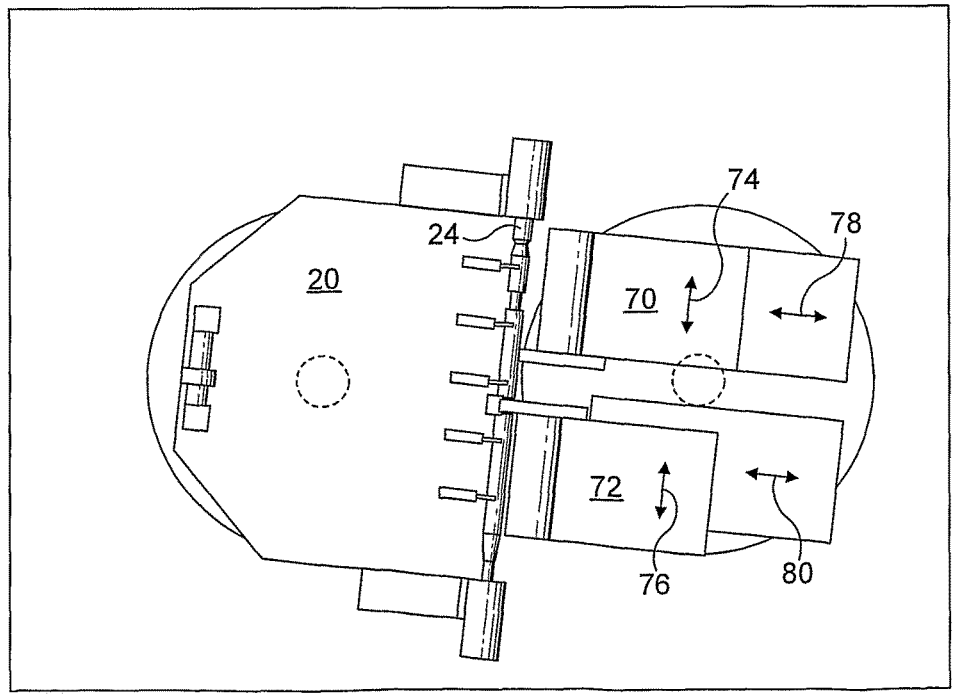
FIG. 21 is a plan view of a machine tool embodying the invention which includes twin grinding wheelheads.

A machine tool employing twin grinding wheels is shown in FIG. 21. Two wheelheads 70, 72 are mounted on the tool support 22. An additional linear axis 74, 76 is provided in association with each wheelhead 70, 72 stacked on the other respective linear axis 78, 80. This facilitates independent control of the grinding wheel locations relative to the longitudinal axis of the workpiece 24. With such a configuration, two features can be ground simultaneously on the workpiece, which may be employed for example in orbital crankpin grinding.

In a machine tool including two rotary axes and one linear axis, only one linear axis moving cover will be required. The two rotary axes may have solid, rotating covers or labyrinths. These may not have any friction joints or significantly influence the motion of the precision machine axes.

The machine base may be formed from granite, cast iron or polymer concrete for example and its fabrication may be relatively inexpensive in comparison to a base for an existing machine tool employing long linear axes.

During construction of a machine tool according to the invention, the precision of the interpolated linear motion between a cutting tool and a workpiece may be measured and any compensation required calculated. This compensation may be incorporated into the instructions governing operation of the controller of the machine tool, for example in software.

Laser calibration may be employed with regard to angle, linear position and straightness, enabling error correction of movement with respect to the rotary and linear axes.

Figure 22A:
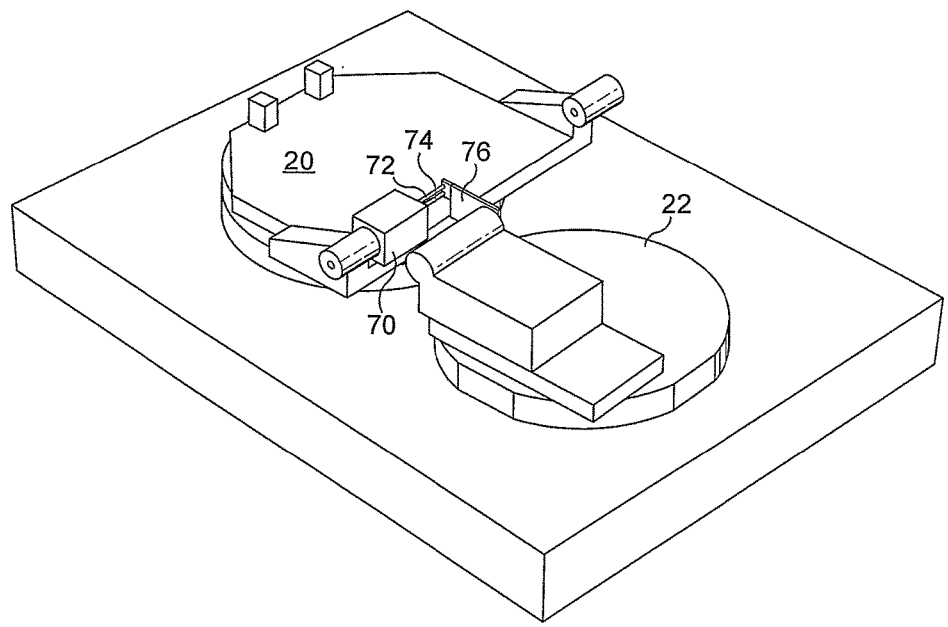
FIGS. 22a and 22b are perspective views showing successive stages in a laser calibration procedure.
Figure 22B:
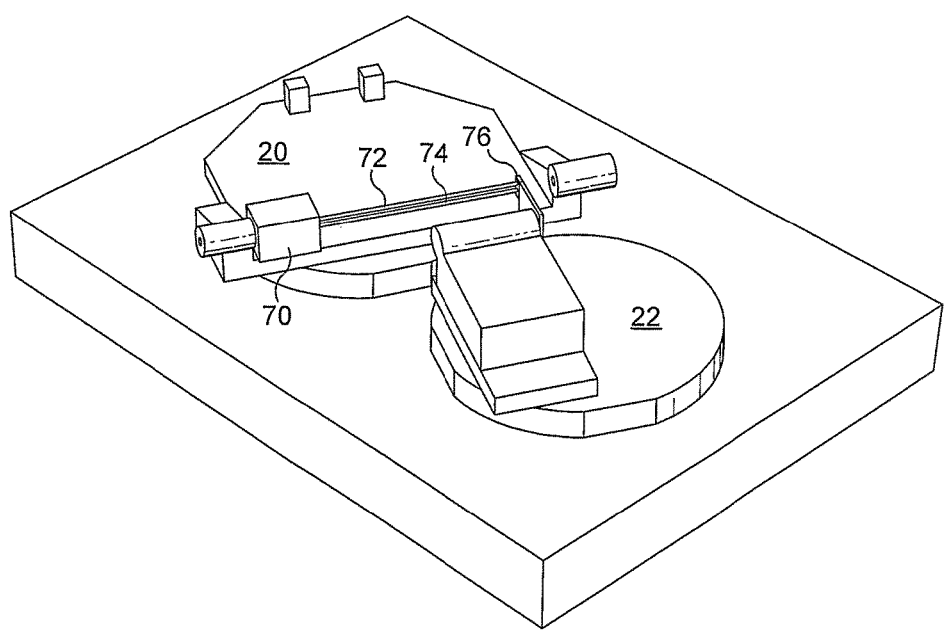

FIGS. 22a and 22b show how the machine can be laser calibrated. A light source 70 is mounted on headstock 26 which generates two parallel laser beams 72, 74 which are incident on a detector 76 carried by the tool support 22.

By moving the two rotary axes and the one linear axis, it is possible (using various sets of laser optics) to measure straightness, position and angle errors and to make correction to compensate for the errors. The correction procedures will vary depending upon the primary requirements for any given workpiece (for example parallelism, diameter or axial position of the feature being machined).

The calibration procedure could include the following steps:
I. Using angular error measurement optics:
   i. Rotate the two axes, slaving the secondary (for example the tool support axis) to the primary axis (for example the workhead support axis) over the full range of motion required to machine the longest component. The linear axis will also be slaved to the primary axis in order to maintain a constant position of the laser beam on the measurement optics.
   ii. Angular errors will affect:
      1. The diameter of the feature being machined;
      2. The parallelism of the feature being machined;
      3. The axial position of the feature being machined.
   iii. Any measured angular error can be compensated for by modifying the motion of the secondary axis relative to the primary axis.
   iv. This procedure will minimize the rotary axis errors (from each encoder) and any additional rotary errors, for example from bearing axis tilt errors and yaw error of the linear axis.
II. Using linear position measurement optics:
   i. Repeat the motion procedure for (I).
   ii. Linear position errors will affect the axial position of the feature being machined.
   iii. If axial position of a feature is of higher priority than parallelism of the feature being machined, then the measured position errors can be compensated (using the secondary rotary axis). This will add slightly to the angular position errors that were minimized during procedure I.
      1. The additional angular error could be relatively insignificant. For example, to correct for a 3 micron axial position error requires (approximately) a 1 arc sec angular correction. 1 arc second over a feature of 50 mm long would result in a taper of 0.25 micron.
III. Using the straightness measurement optics to determine horizontal straightness errors:
   i. Repeat the motion procedure.
   ii. Linear straightness errors will affect the diameter of the feature being machined.
   iii. Measured horizontal straightness errors can be directly compensated for using the linear axis.

These procedures enable the error motion correction without the need to align orthogonal axes, a key benefit of this machine design.

If the axial position of the machined features is particularly tight, a linear encoder may be employed (such as a laser interferometer mounted between the two rotary axes) as a secondary encoder to minimise the linear position errors caused by rotary encoder errors.

This may be achieved applying similar principles to those employed in the above calibration procedures.

Preferred embodiments of the machine tool use rotary encoders to synchronize motion between two rotary axes. It may be possible to maintain around 1 arc second absolute position error between the two axes. A rotary position error produces a linear error at a given radius of approximately 5 micron (of linear error) per meter (of radius) per arc second (of error). For a component around 1500 mm long, the radius from rotary axis centre to the end of the component may be around 900 mm, for example. This results in a linear position error (in the axial direction of the component) of around 3 micron per arc second of error.

In most cases this will be acceptable. However, for extremely demanding requirements (for example requiring no more than 1 micron of linear error) it may be preferable to make a direct, in-line linear error measurement (rather than an inferred linear measurement from a rotary encoder)

An example of a long range linear laser encoder is an RLE10, as marketed by Renishaw®. An encoder of this type could be used to provide linear position feedback as the two rotary axes move relative to each other. Thus, axial position errors resulting between the cutting tool and the component from rotary encoder errors can be measured directly as linear position errors.

The configuration of the linear encoder would be similar to that shown above in FIGS. 22a and 22b for the machine calibration procedure. However, the encoder's laser and target would need to be enclosed in a cover (not shown in the Figures), away from (probably below) the machining contact position.

Whilst the embodiments described with reference to the drawings are grinding machines, it will be appreciated that a broad range of machining-related operations can be implemented in accordance with the invention. In addition to grinding operations, other applications are turning or polishing for example, and inspection of machined components.

It will be appreciated that references herein to orthogonal or parallel relative orientations and the like are to be interpreted as defining substantially orthogonal or parallel relationships between components within practical tolerances.

The invention claimed is:
1. A machine tool, comprising:
   a machine base;
   a first support provided on a first rotational machine axis, the first rotational machine axis being rigidly mounted on the base in an immovably fixed position relative to the base and comprising a first drive operable to rotate the first support about a first axis of rotation;

a second support provided on a second rotational machine axis, the second rotational machine axis being rigidly mounted on the base in an immovably fixed position relative to the base and comprising a second drive operable to rotate the second support about a second axis of rotation, wherein the second axis of rotation of the second rotational machine axis is parallel to and spaced laterally from the first axis of rotation of the first rotational machine axis, the second rotational machine axis carries a mount moveable relative to the second support by a first linear machine axis, the first linear machine axis comprises a third drive operable to move the mount towards and away from the first support during operation of the machine tool along a first linear axis orthogonal to the second axis of rotation of the second rotational machine axis, the first linear machine axis is the only linear machine axis on the second rotational machine axis with an axis of motion in the direction of the first linear axis, and one of the first support and the mount is configured to carry a grinding wheel having a rotational axis and the other is configured to carry a workpiece having a longitudinal axis; and a control arrangement configured to control the orientation of the first support about the first axis of rotation of the first rotational machine axis, the orientation of the mount about the second axis of rotation of the second rotational axis and a location of the mount along the first linear axis of the first linear machine axis, using the first, second and third drives, respectively, so as to govern the position and orientation of the first support and the mount relative to each other, to rotate the one of the first support and the mount such that the rotational axis of the grinding wheel is non-parallel with respect to the longitudinal axis of the workpiece, and to grind the workpiece with the grinding wheel by moving the grinding wheel longitudinally along the workpiece with the rotational axis of the grinding wheel at an angle to the longitudinal axis of the workpiece to form a tapered profile on the workpiece.

2. A machine tool of claim 1, wherein one of the first or second supports provides movement relative to the machine base along a second linear machine axis parallel to a respective one of the first axis of rotation of the first rotational machine axis or the second axis of rotation of the second rotational machine axis.

3. A machine tool of claim 1, wherein the first and second supports are independently rotatable about the respective first axis of rotation of the first rotational machine axis and the second axis of rotation of the second rotational machine axis.

4. A machine tool of claim 1, wherein the rotational positions of the first and second supports are selectively lockable relative to the machine base.

5. A machine tool of claim 1, wherein the first and second supports are supported on the machine base via journal and thrust bearings.

6. A machine tool of claim 1, wherein the first and second supports are rotatable relative to the machine base by respective direct drive motors.

7. A machine tool of claim 1, wherein each of the first and second supports includes a rotation sensor for providing a signal related to the rotational position of the respective first and second supports relative to the machine base, and the control arrangement is operable to receive the signals from the rotation sensors, and to compensate for inaccuracy in the motion of the first and second supports during a machining operation.

8. A machine tool of claim 1, wherein two tool mounts are carried by one of the first or second supports, each of the two tool mounts being moveable relative to the one of the first or second supports independently of the other along mutually parallel first linear axes orthogonal to the respective first or second axis of rotation of the respective first or second rotational machine axis.

9. A machine tool of claim 8, wherein at least one of the tool mounts is also moveable relative to one of the first or second supports along a second linear axis orthogonal to the mutually parallel first linear axes.

10. A machine tool of claim 1, wherein the other of the first support and the mount are arranged to support an elongate workpiece having a longitudinal axis in a plane orthogonal to the first and second axes of rotation of the respective first and second rotational machine axes.

11. A method of machining a workpiece using a machine tool of claim 1, comprising the steps of:
(a) mounting a grinding wheel having a longitudinal axis on the one of the first support and the mount;
(b) mounting a workpiece on the other of the first support and the mount;
(c) rotating the one of the first support and the mount such that the rotational axis of the grinding wheel is non-parallel with respect to the longitudinal axis of the workpiece; and
(d) grinding the workpiece with the grinding wheel by moving the grinding wheel longitudinally along the workpiece with the rotational axis of the grinding wheel at an angle to the longitudinal axis of the workpiece to form a tapered profile on the workpiece.

12. A method of calibrating a machine tool of claim 7, comprising the steps of:
(a) mounting a laser light source on one of the first or second supports;
(b) emitting a laser beam from the light source which is incident on an optical device supported by the other of the first or second supports;
(c) monitoring a laser beam path with respect to positions of the first and second supports as measured by the respective rotation sensors;
(d) calculating positioning errors; and
(e) calibrating the control arrangement so as to reduce the errors.

13. A machine tool, comprising:
a machine base;
a first support provided on a first rotational machine axis, the first rotational machine axis being rigidly mounted on the base in an immovably fixed position relative to the base and comprising a first drive operable to rotate the first support about a first axis of rotation;
a second support provided on a second rotational machine axis, the second rotational machine axis being rigidly mounted on the base in an immovably fixed position relative to the base and comprising a second drive operable to rotate the second support about a second axis of rotation,
wherein the second axis of rotation of the second rotational machine axis is parallel to and spaced laterally from the first axis of rotation of the first rotational machine axis, the second rotational machine axis carries a mount moveable relative to the second support by a first linear machine axis, the first linear machine axis comprises a third drive operable to move the mount towards and away from the first support during operation of the machine tool along a first linear axis orthogonal to the second axis of rotation of the second rotational machine axis, the first linear machine axis is the only linear machine axis on the second rotational machine axis with an axis of motion in the direction of the first linear axis, and one of the first support and the mount is configured to carry a tool having a reference axis and the other is configured to carry a workpiece; and a control arrangement configured to control the orientation of the first support about the first axis of rotation of the first rotational machine axis, the orientation of the mount about the second axis of rotation of the second rotational axis and a location of the mount along the first linear axis of the first linear machine axis, using the first, second and third drives, respectively, so as to govern the position and orientation of the first support and the mount relative to each other, and to move the first support relative to the first axis of rotation of the first rotational machine axis and the mount relative to the second axis of rotation of the second rotational machine and the first linear axis such that a predetermined curved surface which is curved in a plane perpendicular to the first and second axes of rotation is machined on the workpiece by the tool while maintaining the reference axis of the tool perpendicular to said surface.

14. A machine tool of claim 13, wherein the rotational positions of the first and second supports are selectively lockable relative to the machine base.

15. A machine tool of claim 13, wherein the first and second supports are supported on the machine base via journal and thrust bearings.

16. A machine tool of claim 13, wherein the first and second supports are rotatable relative to the machine base by respective direct drive motors.

17. A machine tool of claim 13, wherein each of the first and second supports includes a rotation sensor for providing a signal related to the rotational position of the respective first and second supports relative to the machine base, and the control arrangement is operable to receive the signals from the rotation sensors, and to compensate for inaccuracy in the motion of the first and second supports during a machining operation.

18. A machine tool of claim 13, wherein two tool mounts are carried by one of the first or second supports, each of the two tool mounts being moveable relative to the one of the first or second supports independently of the other along mutually parallel first linear axes orthogonal to the respective first or second axis of rotation of the respective first or second rotational machine axis.

19. A machine tool of claim 18, wherein at least one of the tool mounts is also moveable relative to one of the first or second supports along a second linear axis orthogonal to the mutually parallel first linear axes.

20. A method of machining a workpiece using a machine tool of claim 13, comprising the steps of:
(a) mounting a tool having a reference axis on one of the first support and the mount;
(b) mounting a workpiece on the other of the first support and the amount; and
(c) moving the first support relative to the first axis of rotation of the first rotational machine axis and the mount relative to the second axis of rotation of the second rotational machine and the first linear axis such that a predetermined curved surface which is curved in a plane perpendicular to the first and second axes of rotation is machined on the workpiece by the tool while maintaining the reference axis of the tool perpendicular to said surface.

21. A method of calibrating a machine tool of claim 17, comprising the steps of:
(a) mounting a laser light source on one of the first or second supports;
(b) emitting a laser beam from the light source which is incident on an optical device supported by the other of the first or second supports;
(c) monitoring a laser beam path with respect to positions of the first and second supports as measured by the respective rotation sensors;
(d) calculating positioning errors; and
(e) calibrating the control arrangement so as to reduce the errors.

* * * * *